(12) United States Patent
Jones et al.

(10) Patent No.: US 11,921,095 B2
(45) Date of Patent: Mar. 5, 2024

(54) DATA ACQUISITION TECHNIQUE FOR RAPID SAMPLING

(71) Applicant: Micromass UK Limited, Wilmslow (GB)

(72) Inventors: Gareth Rhys Jones, Altrincham (GB); Michael McCullagh, Northwich (GB); Alastair Murray Booth, Glossop (GB)

(73) Assignee: Micromass UK Limited, Wilmslow (GB)

( * ) Notice: Subject to any disclaimer, the term of this patent is extended or adjusted under 35 U.S.C. 154(b) by 537 days.

(21) Appl. No.: 17/069,477

(22) Filed: Oct. 13, 2020

(65) Prior Publication Data

US 2021/0109069 A1    Apr. 15, 2021

(30) Foreign Application Priority Data

Oct. 14, 2019  (GB) ..................... 1914851

(51) Int. Cl.
*G01N 30/86*  (2006.01)
*G01N 30/88*  (2006.01)
*H01J 49/00*  (2006.01)
*H01J 49/04*  (2006.01)

(52) U.S. Cl.
CPC ......... *G01N 30/88* (2013.01); *G01N 30/8675* (2013.01); *H01J 49/0027* (2013.01); *H01J 49/0031* (2013.01); *H01J 49/0036* (2013.01); *G01N 2030/8804* (2013.01); *G01N 2030/889* (2013.01); *H01J 49/0454* (2013.01)

(58) Field of Classification Search
CPC ............... G01N 30/88; G01N 30/8675; G01N 2030/8804; G01N 2030/889; H01J 49/0027; H01J 49/0031; H01J 49/0036; H01J 49/0454
See application file for complete search history.

(56) References Cited

U.S. PATENT DOCUMENTS

2005/0063864 A1   3/2005  Sano et al.
2014/0326875 A1*  11/2014  Asano ................... H01J 49/005
                                                                      250/281

OTHER PUBLICATIONS

Cameron, S., et al., "Laser assisted rapid evaporative ionization mass spectrometry: an automated platform for direct-from-culture speciation and clinical sample analysis", MSACL 2018 EU. (Year: 2018).*
Sinclair, I., et al., "Novel acoustic loading of a mass spectrometer: toward next-generation high-throughput MS screening", Journal of Laboratory Automation, vol. 21(I), pp. 19-26. (Year: 2016).*

(Continued)

*Primary Examiner* — Benjamin L Lebron
(74) *Attorney, Agent, or Firm* — Goodwin Procter LLP

(57) ABSTRACT

A method of mass spectrometry is disclosed comprising repeatedly or continuously causing first analyte sample to be released or ejected from a first sample. A determination is made as to whether or not a quality threshold such as an intensity threshold has been met or exceeded, wherein if the quality threshold has been met or exceeded then the method further comprises repeatedly or continuously causing second analyte sample to be released or ejected from a second sample.

17 Claims, 5 Drawing Sheets

(56) References Cited

OTHER PUBLICATIONS

Sinclair, I., et al., "Acoustic mist ionization platform for direct and contactless ultrahigh-throughput mass spectrometry analysis of liquid samples", Analytical Chemistry, 91, pp. 3790-3794. (Year: 2019).*

Sinclair, I., et al., "Acoustic mist ionization mass spectrometry (AMI-MS) as a drug discovery platform", Expert Opinion on Drug Discovery, vol. 14, 609-617. (Year: 2019).*

Sinclair, I., et al., "Acoustic mist ionization platform for direct and contactless ultrahigh-throughput mass spectrometry analysis of liquid samples", Analytical Chemistry, 91, 3790-3794. (Year: 2019).*

GB Search Report under Section 17(5), for Appliction No. GB1914851.9, dated Jul. 16, 2020, 3 pages.

Shahgholi, M., et al., "Sugar additives for MALDI matrices improve signal allowing the smallest nucleotide change (A:T) in a DNA sequence to be resolved", Nucleic Acids Research 29(19):e91 (2001) 10 pages.

* cited by examiner

Fig. 1

Prior art

DATA ACQUISITION TECHNIQUE FOR RAPID SAMPLING

CROSS-REFERENCE TO RELATED APPLICATIONS

This application claims priority from and the benefit of United Kingdom patent application No. 1914851.9 filed on Oct. 14, 2019, the entire content of which is incorporated herein by reference.

FIELD OF THE INVENTION

The present invention relates generally to data acquisition techniques for rapid sampling especially high throughput screening. Various embodiments relate to methods of mass spectrometry, mass spectrometers and in particular to methods of acoustic mist ionisation and acoustic droplet ejection.

BACKGROUND

Acoustic Mist Ionisation ("AMI") is a technique which is used to generate or liberate ions directly from liquid sample confined within, for example, the wells of a sample plate. The sample plate may comprise a microtitre plate. In particular, the microtitre plate may comprise a standard 384-well configuration although other configurations of microtitre plate may also be used. Acoustic Mist Ionisation has the ability to introduce sample ions into a mass spectrometer at a rate of up to three unique samples per second (which is equivalent to processing one 384-well microtitre plate every four minutes including unloading and loading time using an autosampler) with negligible crosstalk.

In addition, the process of Acoustic Mist Ionisation can be repeated many hundreds of times to eject or otherwise release sample from the same sample well without destroying or damaging the sample. This may be contrasted with other ionisation techniques wherein the ionisation process may transfer excessive energy into the sample which has the disadvantageous effect of irreversibly altering the sample. Accordingly, some conventional ionisation techniques may only be performed either once or only a few times on the same sample and hence are not generally repeatable.

Acoustic Mist Ionisation has been successfully applied to the field of High Throughput Screening ("HTS"). High Throughput Screening is a method which seeks to identify compounds which demonstrate activity on a particular reaction pathway. Mass spectrometry may be employed to determine the relative abundance of two or more ions (e.g. substrate and product). When a certain ratio is exceeded the compound may be said to be active and may then become a candidate for further study.

Screens of up to 2.5 million compounds have been successfully run in timeframes unmatched by any other technology.

An Acoustic Mist Ionisation ("AMI") ion source can provide a number of advantages to sample analysis, such as extremely high throughput with no cross contamination between samples. It is possible to repeatedly eject sample from the same well of a 384-well microtitre plate many hundreds of times, with minimal sample depletion and no denaturisation. The ions observed for the majority of samples are very similar to those observed by the process of Electrospray Ionisation ("ESI") and so Acoustic Mist Ionisation ion sources have the utility for the characterisation of a library of compounds and to assist in method development for general analysis.

Alternative "shotgun" sample introduction techniques are known including Direct Analysis in Real Time ("DART"), Matrix Assisted Laser Desorption Ionisation ("MALDI") and Laser Diode Thermal Desorption ("LDTD"). However, these techniques are commonly sample destructive and it is not possible to reanalyse the same sample multiple times. Furthermore, some known ionisation techniques such as Matrix Assisted Laser Desorption Ionisation ("MALDI") suffer from the problem that attempting to reanalyse the same sample can cause changes to the nature of the sample due to excess energy transfer. In contrast, such adverse effects are not observed when reanalysing a sample using Acoustic Mist Ionisation.

However, one problem with the current approach of analysing samples using Acoustic Mist Ionisation is that time may be wasted acquiring unnecessary data. Furthermore, some samples may also need to be reanalysed due to insufficient data quality.

It is therefore desired to provide an improved method of analysing samples.

SUMMARY

According to an aspect there is provided a method of mass spectrometry comprising:

repeatedly or continuously causing first analyte sample to be released or ejected from a first sample; and determining whether or not a quality threshold has been met or exceeded, wherein if a quality threshold has been met or exceeded then the method further comprises:

repeatedly or continuously causing second (different) analyte sample to be released or ejected from a second (different) sample.

The quality threshold may comprise an intensity threshold.

According to various embodiments if a determination is made that the quality threshold has not been met or exceeded then first analyte sample may continue to be released or ejected from the first sample until a determination is made that the quality (e.g. intensity) threshold has been met or exceeded.

Embodiments are contemplated wherein if a quality threshold has still not been met or exceeded after a predetermined period of time then the data acquisition technique may move on to sample the second (or next or further sample). For example, the sample may comprise a blank or control sample containing no analyte and hence a quality (e.g. intensity) threshold may never be met or exceeded.

According to various embodiments if a determination is made that the quality threshold has not been met or exceeded then second analyte sample may continue to be released or ejected from the second sample until a determination is made that the quality threshold has been met or exceeded.

Embodiments are contemplated wherein if a quality threshold has still not been met or exceeded after a predetermined period of time then the data acquisition technique may move on to sample a third, next or further sample.

The method may further comprise repeatedly or continuously causing third (different) analyte sample to be released or ejected from a third (different) sample and determining whether or not a quality threshold has been met or exceeded, wherein if a quality threshold has been met or exceeded then the method may further comprise repeatedly or continuously causing fourth or further (different) analyte sample to be released or ejected from a fourth or further (different) sample.

As before, if a quality threshold has not been met or exceeded after a pre-determined period of time then the data acquisition technique may move on to sample or ionise the next sample.

According to various embodiments the pre-determined period of time may be in the range <0.1 s, 0.1-0.5 s, 0.5-1.0 s, 1.0-1.5 s, 1.5-2.0 s or >2.0 s.

According to another aspect there is provided a method of mass spectrometry comprising:

repeatedly or continuously causing first analyte sample to be released or ejected from a first sample; and performing one or more experiments on the first analyte sample, wherein one or more of the experiments or each experiment is performed until a determination is made that a quality threshold has been met or exceeded;

wherein the method then further comprises:

(i) repeatedly or continuously causing second analyte sample to be released or ejected from a second (different) analyte sample; and (ii) performing one or more experiments on the second analyte sample, wherein one or more of the experiments or each experiment is performed until a determination is made that a quality threshold has been met or exceeded.

The quality threshold may, for example, relate to the profile or beam shape of an ion mobility peak observed in an ion mobility spectrum and/or may relate to a characteristic of a fragment or daughter ion mass spectrum or associated mass spectral data. For example, the quality threshold may relate to the intensity of one or more fragment ions which are observed when parent ions of interest are fragmented and the resulting fragment, daughter or product ions are then mass analysed. In particular, the quality threshold may relate to the observance of one or more species of fragment ions of interest which are observed as having a particular intensity above an intensity threshold and/or which have a certain mass or mass to charge ratio difference relative to the corresponding parent ions.

According to various embodiments fragment ions which are determined to have a mass loss relative to the corresponding parent ions of a certain amount (e.g. due to the loss of oxygen) may be determined to correspond with ions which are not of particular interest. As a result, these fragment ions may be excluded from any consideration as to whether or not fragment ions of interest are observed which have an intensity above an intensity threshold.

The quality threshold may therefore relate to the intensity of fragment ions of potential interest. It will be understood, for example, that some observed fragment ions may be relatively abundant or otherwise may have a relatively high intensity but may not correspond with fragment ions which are of potential interest.

The method may further comprise: (i) repeatedly or continuously causing third or further analyte sample to be released or ejected from a third or further (different) analyte sample; and (ii) performing one or more experiments on the third or further analyte sample, wherein one or more of the experiments or each experiment may be performed until a determination is made that a quality threshold or other threshold has been met or exceeded.

If a quality threshold has not been met or exceeded after a pre-determined period of time then the data acquisition technique may move on to sample the next sample.

According to various embodiments the pre-determined period of time may be in the range <0.1 s, 0.1-0.5 s, 0.5-1.0 s, 1.0-1.5 s, 1.5-2.0 s or >2.0 s.

Various embodiments relate to the ability to repeatedly or continuously sample from the same sample well as a means of obtaining a desired quality of data in an automated fashion. The method may relate to a method of High Throughput Screening.

According to various embodiments two distinct approaches are contemplated.

According to a first approach a desired quality of data may be required for a single experiment type. According to this embodiment sample may be repeatedly or continuously ejected from a sample well until a quality threshold is exceeded (or the number of ejections exceeds a fixed limit) at which point the next sample well may then be analysed. The quality threshold may comprise an intensity threshold. The data may be acquired to a single file and the data may then be subsequently parsed.

According to a second approach a set of or number of different experiments may be performed on the same sample from the same sample well. According to this approach sample may be ejected and a first experiment may be conducted on the sample until a quality threshold is exceeded (or the number of ejections exceeds an ejection limit). The quality threshold may comprise an intensity threshold of either parent ions and/or fragment ions or a characteristic such as ion mobility peak shape. Once a quality threshold has been exceeded (or alternatively the number of ejections exceeds an ejection limit) a second experiment and optionally one or more further experiments may be conducted on the same sample. The results of a previous experiment may be used to determine the conditions for a second or subsequent experiment. Once all desired experiments have been conducted on a particular sample, the next sample in the sample plate or microtitre plate may then be analysed. According to this embodiment each sample may generate a collection of data files for each experiment conducted.

The above approaches to data acquisition can minimise the amount of time required to analyse a very large number of samples. In particular, the approach according to various embodiments reduces the time spent acquiring unnecessary data and reduces the chances or need of having to reanalyse samples due to insufficient data quality. The approach according to various embodiments therefore provides an improved method of High Throughput Screening.

When running a set of experiments on each sample, and using the results of each experiment to define the conditions of the next, it is possible to characterise a sample in a fraction of the time that would otherwise be required using conventional approaches.

In High Throughput Screening applications, the approach according to various embodiments maximises the chances of the assay being successful i.e. all samples are analysed to a suitable quality standard in the minimum possible time. Conventionally, any sample data that has been identified to have insufficient quality (either manually or automatically) needs to be reanalysed, with an associated time penalty—the majority of which is the problem identification step.

The approach according to various embodiments speeds up the time required to characterise a large collection of samples. Conventionally, each sample is run on a very short liquid chromatography ("LC") gradient with at least one run for each experiment. The fastest speed at which this can be performed is approximately 10 seconds per run and this also carries with it the risk of sample crosstalk due to multiple samples using common flow paths in their delivery. The conventional approach also consumes a large amount of solvent.

The limited capacity of most liquid chromatography ("LC") sample managers limits the number of samples that could be analysed in a batch whereas a full Acoustic Mist Ionisation ("AMI") system or equivalent system is capable of storing and analysing 96,000 samples. In the conventional fast liquid chromatography ("LC") approach, it would be necessary to review the results to determine if the sample requires reanalysis.

A key component of the workflow described herein according to various embodiments is the ability to continuously or repeatedly introduce ions of a target compound using an Acoustic Mist Ionisation source (or another ion source) until a number of experiments have been completed to pre-set quality criteria, before then moving onto to sample from the next sample of a sample plate.

By way of example, embodiments are contemplated wherein one, two, three, four or more of the most abundant ions of a sample are noted or identified. The Acoustic Mist Ionisation or other ion source may ionise the sample until there are sufficient ions present to make an accurate determination of mass or mass to charge ratio. These ions may then be isolated using a mass analyser or mass filter (for example, a quadrupole mass filter of a quadrupole Time of Flight mass analyser) and the isolated ions may then be fragmented to identify major fragment species.

At least one of the one or more experiments may comprise: (i) determining an optimum collision or fragmentation energy or setting; (ii) obtaining positive and/or negative ionisation spectra; (iii) performing high/low collision energy switching ($MS^e$); (iv) determining higher order fragmentation pathways ($MS^n$); (v) determining ion mobility collision cross section ("CCS") values of parent, fragment or product ion species; (vi) determining post ionisation modification attributes optionally by Electron Transfer Dissociation ("ETD"); (vii) determining ion mobility collision cross section ("CCS") values with a plurality of (or one or more) collision gases; and (viii) determining instrument specific optimisation parameters such as cone voltage.

For example, according to an embodiment first analyte sample from a first sample may be repeatedly or continuously released or ejected from a first sample until a quality threshold has been met or exceeded. According to an embodiment the quality threshold or other threshold may comprise an intensity threshold such that it is established that a particular analyte is present in the sample in sufficient quantity for further experiments to be performed. In a subsequent experiment a mass filter may be operated to select parent ions of interest which have been observed to be present in sufficient quantity such as to exceed an intensity threshold. The selected parent ions of interest may then be fragmented in a collision or fragmentation cell or device and the resulting fragment ions may then be mass analysed. A determination may then be made that the fragment ion mass spectral data which has been obtained meets or exceeds a quality threshold.

According to an embodiment, ion mobility data relating to parent ions and/or fragment ions may be obtained. For example, according to an embodiment parent ions and/or fragment ions may be passed through an ion mobility separation device and the ion mobility drift time of the parent ions and/or fragment ions may be determined. According to an embodiment an ion mobility collision cross section ("CCS") value for the parent ions and/or various fragment or product ions may be determined. It is also contemplated that the composition of a collision gas or other gas provided in an ion mobility separation device may be varied or that a plurality of different ion mobility separation devices having different collision or other gas provided therein may be provided, such that the composition of the collision or other gas may vary between the different ion mobility separation devices.

The quality threshold may comprise a spectral quality threshold or a mass spectral quality threshold.

According to various embodiments the quality threshold which is preferably applied may comprise a threshold which is determined by a mass analyser or ion detector and associated electronics or control system. The quality threshold may comprise an intensity threshold or the quality threshold may relate to the shape or profile of an ion peak or ion mobility peak. For example, the quality threshold may be related to the correlation between an observed ion peak or ion mobility peak and a theoretical or expected Gaussian or other distribution. The quality threshold may relate to the profile of an observed peak and may relate to the standard deviation or variance of the observed ion peak or ion mobility peak.

The method may further comprise mass analysing the first, second, third and further analyte samples to obtain mass spectral data.

The first and subsequent samples may be mass analysed by, for example, a quadrupole mass analyser or a Time of Flight mass analyser.

The step of determining whether or not a quality threshold has been met or exceeded may comprise determining the most intense ion peak in the mass spectral data and/or determining whether the number of ions or the intensity of ions relating to the most intense ion peak meets or exceeds an intensity threshold.

Determining whether or not a quality threshold has been met or exceeded may comprise selecting the most abundant ion peak (or a number of abundant ion peaks) and/or determining whether or not the number of ions in the most abundant ion peak (or other ion peaks of interest) are in excess of a threshold which may be predetermined.

The step of determining whether or not a quality threshold has been met or exceeded may comprise determining whether the number of ions or the intensity of ions relating to one or more ion peaks meets or exceeds an intensity threshold.

Determining whether or not a quality threshold has been met or exceeded may comprise identifying a number of relatively abundant ion peaks (or just one ion peak) and determining whether or not one or more of the relatively abundant ion peaks comprise a number of ions which are in excess of a threshold which may be predetermined.

The step of determining whether or not a quality threshold has been met or exceeded may comprise determining whether one or more ions or ion peaks exceed an intensity threshold and/or whether one or more ion peaks or corresponding ion mobility peaks have either: (i) an expected peak shape or profile; (ii) a substantially Gaussian distribution or other profile; or (iii) a standard deviation or variance above or below a threshold.

According to various embodiments the quality or peak shape of an ion mobility peak may be used as a determination as to whether or not sufficient sample has been ionised. For example, if the ion mobility peak shape is generally poor or has an irregular or substantially non-Gaussian distribution or other profile then ionisation may be continued until the quality or peak shape of the ion mobility peak is observed or determined to have improved. According to an embodiment the standard deviation (or variance) of an ion mobility peak may be determined. As an ion mobility peak increases with intensity with time it may become narrower in width or distribution so that the standard deviation (or variance) decreases accordingly. Embodiments are contemplated wherein sample may be repeatedly or continually sampled or ionised until an ion peak or an ion mobility peak is observed having a standard deviation $\sigma \leq 0.1$, $\sigma \leq 0.2$, $\sigma \leq 0.3$, $\sigma \leq 0.4$, $\sigma \leq 0.5$, $\sigma \leq 0.6$, $\sigma \leq 0.7$, $\sigma \leq 0.8$, $\sigma \leq 0.9$ or $\sigma \leq 1.0$. Embodiments are contemplated wherein sample may be continually sampled or ionised until an ion peak or an ion mobility peak has a standard deviation $\sigma$ in the range $\sigma \leq 0.1$, 0.1-0.2, 0.2-0.3, 0.3-0.4, 0.4-0.5, 0.5-0.6, 0.6-0.7, 0.7-0.8, 0.8-0.9, 0.9-1.0 or $\geq 1.0$.

The step of causing analyte sample to be released or ejected from a sample may comprise using an Acoustic Mist Ionisation ("AMI") ion source to release or eject the analyte sample.

The approach according to various embodiments is particularly suitable in conjunction with an Acoustic Mist Ionisation ion source wherein acoustic energy is focussed into a liquid sample located in proximity to an electric field causing a mist of charged droplets to be ejected from the liquid sample and drawn towards a sampling nozzle or electrode.

The step of causing analyte sample to be released or ejected from a sample may comprise using an Acoustic Droplet Ejection ("ADE") source to release or eject sample.

Acoustic Droplet Ejection is similar to Acoustic Mist Ionisation in that acoustic energy is focussed into a liquid sample to cause droplets to be ejected from the liquid sample. However, it is not essential that the droplets are ejected in proximity to an electric field and accordingly the droplets may be subsequently ionised.

The step of causing analyte sample to be released or ejected from a sample may comprise using a Laser Assisted Rapid Evaporative Ionisation Mass Spectrometry ("LA-REIMS") ionisation source to release or eject sample.

According to various embodiments a Laser Assisted Rapid Evaporative Ionisation Mass Spectrometry ("LA-REIMS") ionisation source may be utilised and may be provided as part of an automated high-throughput platform. The laser may comprise a carbon dioxide ("$CO_2$") or other laser which may be arranged so as to rapidly heat and evaporate a sample. The sample may comprise a solid sample such as human or animal tissue. The laser may be directed on to the sample from a relatively short distance of, for example, 2 mm.

According to another aspect there is provided a method of high throughput screening comprising a method of mass spectrometry as described above.

According to another aspect there is provided a mass spectrometer comprising:
an ion source which is arranged and adapted to repeatedly or continuously cause first analyte sample to be released or ejected from a first sample; and
a control system which is arranged and adapted to determine whether or not a quality threshold has been met or exceeded, wherein if a quality threshold has been met or exceeded then the ion source is arranged to repeatedly or continuously cause second analyte sample to be released or ejected from a second sample.

According to another aspect there is provided a mass spectrometer comprising:
an ion source which is arranged and adapted to repeatedly or continuously cause first analyte sample to be released or ejected from a first sample; and
a control system which is arranged and adapted to cause one or more experiments to be performed on the first analyte sample, wherein one or more of the experiments or each experiment is performed until a determination is made that a quality threshold has been met or exceeded and wherein the control system is further arranged and adapted: (i) to repeatedly or continuously cause second analyte sample to be ejected from a second analyte sample; and (ii) to perform one or more experiments on the second analyte sample, wherein one or more of the experiments or each experiment is performed until a determination is made that a quality threshold has been met or exceeded.

The control system may be arranged to repeat steps (i) and (ii) one or more times.

At least one of the one or more experiments may comprise: (i) determining an optimum collision or fragmentation energy or setting; (ii) obtaining positive and/or negative ionisation spectra; (iii) performing high/low collision energy switching ($MS^e$); (iv) determining higher order fragmentation pathways ($MS^n$); (v) determining ion mobility collision cross section ("CCS") values of parent, fragment or product ion species; (vi) determining post ionisation modification attributes optionally by Electron Transfer Dissociation ("ETD"); (vii) determining ion mobility collision cross section ("CCS") values with a plurality of (or one or more) collision gases; and (viii) determining instrument specific optimisation parameters such as cone voltage.

The quality threshold may comprise a spectral quality threshold or a mass spectral quality threshold.

The mass spectrometer may comprise a mass analyser for mass analysing the first, second and further analyte samples to obtain mass spectral data.

The control system may be arranged and adapted to determine the most intense ion peak in the mass spectral data and/or to determine whether the number of ions or the intensity of ions relating to the most intense ion peak meets or exceeds an intensity threshold.

The control system may be arranged and adapted to determine whether the number of ions or the intensity of ions relating to one or more ion peaks meets or exceeds an intensity threshold.

The control system may be arranged and adapted to determine whether one or more ions or ion peaks exceed an intensity threshold and/or whether one or more ion peaks or corresponding ion mobility peaks have either: (i) an expected peak shape or profile; (ii) a substantially Gaussian distribution or other profile; or (iii) a standard deviation or variance above or below a threshold.

The ion source may be selected from the group consisting of: (i) an Acoustic Mist Ionisation ("AMI") ion source; (ii) an Acoustic Droplet Ejection ("ADE") source; or (iii) a Laser Assisted Rapid Evaporative Ionisation Mass Spectrometry ("LA-REIMS") ion source.

According to various embodiments collision energy optima may be determined for each fragmentation pathway. The ion mobility spectrometry ("IMS") collision cross section ("CCS") values for the one, two, three, four or more most abundant ions may then be determined optionally with an Acoustic Mist Ionisation or other ion source ejecting sample until an appropriate number of ions are present to make an accurate measurement. Once all experiments have been completed the next sample in the sample plate may then be analysed. Once all samples in a sample plate have been analysed, additional sample plates can then be analysed in an automated fashion using a suitable plate loader.

Other compound attributes which may be determined within a workflow according to various embodiments include: (i) positive and negative ionisation spectra; (ii) high/low collision energy switching ($MS^e$); (iii) higher order fragmentation pathways ("MS"); (iv) ion mobility collision cross section ("CCS") values of parent, fragment or product species; (v) post ionisation modification attributes (e.g. Electron Transfer Dissociation ("ETD"); (vi) ion mobility collision cross section ("CCS") values with a plurality of (or one or more) collision gases; and (vii) instrument specific optimisation parameters such as cone voltage.

According to an aspect there is provided a workflow wherein the introduction of ions generated by an acoustic mist ionisation source (or another type of ion source) is governed by the quality of the cumulative mass spectral data, to predefined criteria, preferably gathered under a range of experimental conditions for the purpose of automated characterisation of multiple samples.

BRIEF DESCRIPTION OF THE DRAWINGS

Various embodiments will now be described, by way of example only, and with reference to the accompanying drawings in which.

DETAILED DESCRIPTION

Various embodiments will now be described which relate to an Acoustic Mist Ionisation ("AMP") ion source and other types of ion sources such as a Laser Assisted Rapid Evaporative Ionisation Mass Spectrometry ("LA-REIMS") ionisation source. An Acoustic Mist Ionisation ("AMI") ion source or a Laser Assisted Rapid Evaporative Ionisation Mass Spectrometry ("LA-REIMS") ion source may be used to repeatedly or continuously eject or otherwise sample analyte from a liquid sample which may be held in a sample well of a sample plate. A Laser Assisted Rapid Evaporative Ionisation Mass Spectrometry ion source may also be used to analyse a solid sample such as a tissue sample.

According to various embodiments the ion source preferably causes sample to be repeatedly or continuously ejected or released from a liquid or other sample in a non-destructive manner in the sense that the process of ejecting or releasing sample from the sample does not damage, harm or otherwise alter the remaining sample. The ion source may be considered to comprise a soft ionisation source which does not cause irreversible damage to the remaining sample.

In particular, an ion source such as an Acoustic Mist Ionisation ("AMI") ion source or a Laser Assisted Rapid Evaporative Ionisation Mass Spectrometry ("LA-REIMS") ionisation source may be used which may cause sample to be ejected from a sample potentially tens or hundreds of times without adversely affecting or altering the remaining sample. The ion source is preferably repeatedly or continuously energised causing ions to be ejected from the sample multiple times until a quality threshold is determined as having been met or exceeded.

Figure 1:
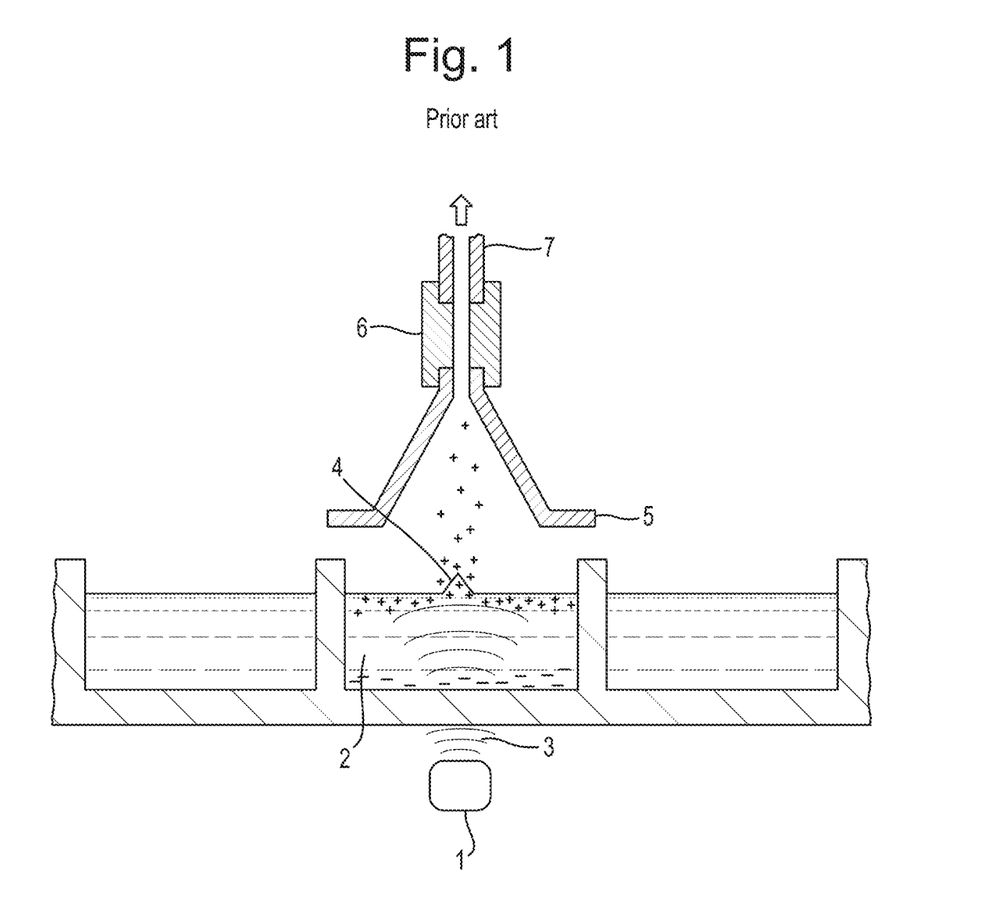
FIG. 1 illustrates a known Acoustic Mist Ionisation ion source which may be utilised according to various embodiments in order to ionise a liquid sample provided in a sample well of a sample plate.

FIG. 1 illustrates some of the general principles of Acoustic Mist Ionisation which are utilised according to various embodiments. Although use of an Acoustic Mist Ionisation ion source is particularly preferred other embodiments are contemplated wherein a different ion source may be used such as a Laser Assisted Rapid Evaporative Ionisation Mass Spectrometry ("LA-REIMS") ion source or an Acoustic Droplet Ejection ("ADE") source.

An Acoustic Mist Ionisation ("AMI") ion source may be provided which is arranged and adapted to focus sound or acoustic waves 3 generated by an ultrasonic transducer 1 into a liquid sample 2. More particularly, the ultrasonic transducer 1 may be arranged to focus sound or acoustic waves into a region around the upper surface of the liquid sample 2 and in particular into a region around the meniscus which the liquid sample 2 forms with a sample well of a sample plate. The sample plate may, for example, comprise a multiwell sample plate such as a microtitre plate. According to an embodiment the sample plate may comprise an acoustic-specific 384-well sample plate although other embodiments are contemplated wherein the sample plate may comprise a different format such as a 96-well sample plate. The sample plate may be made of a plastic and is preferably arranged to transmit the sound or acoustic waves 3 with minimal attenuation or disruption.

The energy which is applied or focussed into the liquid sample 2 may be tuned so that a Taylor cone 4 is formed on the upper surface of the liquid sample 2 with the result that a mist of droplets is ejected or otherwise released from the upper surface of the liquid sample 2 and in particular from the cone region which forms, in use, upon the upper surface of the liquid sample 2.

A plurality of different liquid samples 2 which are desired to be analysed may be provided within different or separate sample wells of a multi-sample well sample plate.

The ultrasonic transducer 1 or other device which is arranged to focus sound or acoustic waves 3 through the liquid sample 2 may be located underneath the base of the sample plate. According to various embodiments the ultrasonic transducer 1 may be arranged so that it does not physically contact the base of the sample plate thereby facilitating high speed analysis of a sample plate.

According to various embodiments a high voltage (such as −3.5 kV) may be applied to a sampling nozzle or sampling electrode 5 which may be arranged directly above the sample plate. The application of a high voltage to the sampling nozzle or sampling electrode 5 causes ions of a desired polarity (e.g. positively charged ions) to be drawn to the surface of the liquid sample 2 and then to be ejected or released from the upper surface of the liquid sample 2 as a fine mist of ionised particles. The sampling nozzle or sampling electrode 5 may be connected to a transfer tube 7 via an insulated spacer 6. The transfer tube 7 may be affixed to the source of a mass spectrometer. The transfer tube 7 may be maintained at a pressure below atmospheric pressure so that a suction effect is created which assists in drawing the mist of charged particles or ions through the funnel of the sampling nozzle or sampling electrode 5, optionally through the insulated spacer 6 and into transfer tube 7. Once the charged particles or ions enter the transfer tube 7 they may then be directed into a vacuum chamber of a mass spectrometer (not shown) for subsequent mass analysis.

According to various embodiments the sample mist may be drawn into a mass spectrometer via a heated interface 7 which may be directly connected to the sampling cone of a mass spectrometer source block (not shown).

The application of a high voltage (such as −3.5 kV) to the sampling nozzle or sampling electrode 5 may cause partitioning of ions within the liquid sample 2. Accordingly, when a negative voltage is applied to the sampling nozzle or sampling electrode 5 then positive ions in the liquid sample 2 or sample solution will be drawn towards the upper surface of the liquid sample 2 and will then be ejected from the liquid sample 2 as a mist of fine droplets. At the same time negative ions will be repelled towards the base of the sample well.

Conversely, if it is desired to generate negative ions for analysis then a positive voltage is preferably applied to the sampling nozzle or sampling electrode 5. When a positive voltage is applied to the sampling nozzle or sampling electrode 5 then negative ions in the liquid sample 2 or sample solution will be drawn towards the upper surface of the liquid sample 2 and will then be ejected from the liquid sample 2 as a mist of fine droplets. At the same time positive ions will be repelled towards the base of the sample well.

Between each ejection event, the polarity of the sampling nozzle or sampling electrode 5 may be inverted or reversed in order to prevent the build-up of charge on the sample plate which might otherwise inhibit the partitioning of ions within the sample well.

According to various embodiments the sample plate may comprise a microtitre plate. Microtitre plates are available in various formats. For example, according to an embodiment the sample plate may comprise a 96-well or a 384-well microtitre plate or other sample plate.

The ultrasonic transducer 1 may comprise an echo transducer or acoustic transducer assembly which may be provided or otherwise located underneath or below the sample well of the sample plate.

The ultrasonic transducer 1 may be energised so as to cause ultrasonic acoustic waves or ultrasonic energy to be directed so as to pass through the base of the sample well and into the liquid sample 2. The sample plate and associated sample wells may be arranged so as to be acoustically transparent so as to permit the transfer of ultrasonic waves emitted from the ultrasonic transducer 1 into the sample liquid 2.

The ultrasonic transducer 1 may be arranged to emit ultrasonic waves having a frequency in the range: (i) 20-30 kHz; (ii) 30-40 kHz; (iii) 40-50 kHz; (iv) 50-60 kHz; (v) 60-70 kHz; (vi) 70-80 kHz; (vii) 80-90 kHz; (viii) 90-100 kHz; or (ix) >100 kHz.

The ultrasonic waves 3 which are directed into the liquid sample 2 in the sample well preferably result in a spray of droplets being ejected from the top or upper surface of the liquid sample 2 in the sample well. As will be discussed in more detail below, the spray of droplets which are ejected preferably comprise charged droplets which form or are released as a mist of droplets.

A relatively high voltage (such as −3.5 kV) may be applied to the collection nozzle or collection electrode 5 with the result that an electric field is maintained between the liquid sample 2 and the collection nozzle or collection electrode 5. As a result, the spray of charged droplets is accelerated through the electric field towards the collection nozzle or collection electrode 5.

According to various embodiments the collection nozzle or collection electrode 5 may be held at a voltage or potential of 0-1 kV, 1-2 kV, 2-3 kV, 3-4 kV, 4-5 kV or >5 kV. According to other embodiments the collection nozzle or collection electrode 5 may be held at a voltage or potential of 0 to −1 kV, −1 to −2 kV, −2 to −3 kV, −3 to −4 kV, −4 to −5 kV or <−5 kV.

According to various embodiments the collection nozzle or collection electrode 5 may be held at a relatively high voltage (such as −3.5 kV) with the result that the application of such a relatively high voltage to the collection nozzle or collection electrode 5 and the resulting electric field which is generated causes charge separation within the liquid sample 2 contained within the sample well of the sample plate or microtitre plate. Charged particles of opposite polarity to that of the potential of the collection nozzle or collection electrode 5 are drawn towards the surface of the liquid sample 2 whereas charged particles of the same polarity to that of the collection nozzle or collection electrode 5 are repelled towards the bottom of the sample well 2. This charge separation effect is illustrated in FIG. 1.

The collection nozzle or collection electrode 5 may comprise an electrically conductive element such as a metal and may be mounted within or to a flexible insulator or spacer 6.

The sampling nozzle or sampling electrode 5 may be maintained at the opposite polarity to the desired ionisation mode of operation. For example, if it is desired to generate positively charged ions (i.e. to operate an ion source in a positive ionisation mode) then the collection nozzle or collection electrode 5 may be maintained at a negative potential such as −3.5 kV. If it is desired to generate negatively charged ions (i.e. to operate an ion source in a negative ionisation mode) then the collection nozzle or collection electrode 5 may be maintained at a positive potential such as 3.5 kV.

A transfer optic or transfer interface 7 having an opening may be secured within or to the flexible insulator 6 and may be arranged to receive charged droplets emitted from the liquid sample 2 contained in the sample well and which have been attracted towards the collection nozzle or collection electrode 5.

The mist of charged droplets is attracted towards the collection nozzle or collection electrode 5 by the electric field and the charged droplets then pass into the transfer optic or transfer interface 7. The charged droplets are then onwardly transmitted to an atmospheric pressure interface of a mass spectrometer or to the initial stage of a mass spectrometer or other analytical instrument.

According to various embodiments the transfer optic or transfer interface 7 may be heated. For example, the transfer optic or transfer interface 7 may be heated to a temperature in the range 100-500° C., 150-400° C. or 200-300° C. According to various embodiments the transfer optic or transfer interface 7 may be heated to a temperature of approximately 250° C.

Each well of a sample plate (which may comprise a 384-well microtitre plate) may be loaded with approximately 50 μl of sample. The Acoustic Mist Ionisation source can typically perform a successful ejection when there is approximately between 20 to 100 µl of sample in the well. Each ejection event may liberate approximately 20 nl of sample and so it is possible to repeatedly sample up to around 1000 times from each sample well. In other words, the ultrasonic transducer 1 may be energised tens, hundreds or even more than a thousand times in order to cause sample to be ejected from a single sample well of a sample plate. It takes approximately at least 5 minutes of continuous ejections before a well is depleted to the point where a mist can no longer be formed during which time approximately 18 µl of sample may have been ejected from the sample well.

It is also possible to perform Acoustic Mist Ionisation on a larger 96-well microtitre plate or acoustic plate. According to this embodiment it is desirable that a larger (e.g. ~200 µl) volume of sample is present and so thousands of ejection events can be performed before the sample is depleted.

According to various embodiments the control interface of the Acoustic Mist Ionisation source or other ion source may be arranged to specify that multiple ejections from the same sample well should be performed. The ejection volume is one of the elements of the ejection pattern which may be loaded and executed for the analysis which is performed.

If the initial assessment of representative samples indicates that the sensitivity is likely to be poor (i.e. low flux of the ions of interest) then the user can specify that multiple ejections will be performed for all samples.

When the data is processed, these additional ejections may be summed to provide a spectrum for each sample with improved quality (i.e. more ions).

According to various embodiments the results recorded by the mass spectrometer may be used to guide the ejection of samples from a multi-well plate. If there is a high variability in the yield of ions from sample to sample due to, for example, compound concentrations, charge competition, matrix/contamination variations, variations in plate loading etc. then the number of ejections required from each sample well in order to attain a specified minimum spectral quality may be highly variable too.

Users using a conventional system tend to adopt a pessimistic or conservative approach and as a result specify that a large number of ejections should be performed from each sample well in order to minimise the risk of needing to reanalyse any sample. However, this approach comes at the expense of speed. It will also be apparent that the conventional approach is not as efficient as possible since many samples will be over sampled i.e. many samples will be sampled more times than is necessary. Also, there may still be some samples which have been sampled an insufficient number of times and hence will still ultimately need to be reanalysed which is time consuming and inefficient.

In contrast to the conventional approach, according to various embodiments the mass spectrometer and associated control system may be arranged to implement a criteria for the minimum required spectral quality. This criteria may, for example, be that a certain number of ions needs to be detected for specific analytes. According to various embodiments the ejection or ionisation of a particular sample may be arranged to continue until such a quality threshold is met or exceeded. According to embodiments the analysis of the next sample may only proceed once the quality threshold for the previous sample has been met or exceeded. This approach has the advantage of minimising any risk of needing to reanalyse a sample whilst also ensuring that analysis can be performed and completed in the shortest possible time.

Other embodiments are contemplated wherein the approach according to various embodiments of imposing a quality threshold and ensuring that the quality threshold is met or exceeded before the next sample is ionised may be utilised, for example, in the field of compound characterisation for the building of libraries and method development.

According to this approach an objective may be set to identify a number of key characteristics of each compound to be analysed such as: (i) principal ion (exact or nominal) masses or mass to charge ratios; (ii) identity of common adducts; (iii) principal fragments of principal ions; (iv) optimum collision energy for the generation of specific fragments of an identified parent ion; (v) ion mobility collision cross section of any parent or fragment ion, with one or more different types of drift gas or combination of gases; (vi) the above characteristics in positive or negative ionisation mode; (vii) spectral characteristics using any post-ionisation modification technique such as Electron Transfer Dissociation ("ETD"); and (viii) spectral characteristics with the variation of mass spectrometer conditions, such as interface temperature or cone voltage.

According to various embodiments a set of experiments may be performed on each sample with predefined quality criteria and optionally maximum sampling limits. The experiments may be run in order with the results of one experiment potentially defining conditions or influencing the settings for the next experiment. For example, the first experiment may seek to establish the most abundant ions from the sample and a subsequent experiment may be arranged to isolate each of the most abundant ions in turn using a mass analyser or mass filter and then to fragment the precursor or parent ions. The principal fragment ions relating to each precursor or parent ion may then be determined or analysed using a second mass analyser or mass filter. Ion mobility spectra of the parent ions and/or fragment ions may be obtained and ionisation of a sample may continue until ion mobility peaks are observed which have a desired quality or profile.

Once all the prescribed experiments have been conducted on an individual sample, the same experiments may then be conducted on the next sample on the sample plate in a predefined order (e.g. A1, A2, A3 etc).

Each set of experiments may yield multiple data files associated with the sample, which may be identified, processed and stored appropriately.

Alternatively, or additionally, the key measurements from each experiment may be made automatically and stored in a database.

According to various embodiments an additional stage may be performed comprising the characterisation of a representative blank matrix or matrices, which facilitates the exclusion of ions present within the samples of interest due to the media in which they are contained.

If multiple matrices are present within the sample set then these may be identified on a per sample basis for specific exclusion, or the collection of all the matrix ions identified may be excluded from all analyses.

This additional stage may be performed either within the plate containing the sample using matrix blank well, from a different plate, or using a collection of previously acquired data.

The technique according to various embodiments as described is equally applicable to sample introduction using intact droplets ejected acoustically by Acoustic Droplet Ejection ("ADE") and ionised through subsequent means, such as an Open Port Probe ("OPP"). Acoustic Droplet Ejection can also be performed with modifications to the Acoustic Mist Ionisation source.

According to other embodiments the samples of interest may be introduced into a mass spectrometer for analysis as intact droplets. For example, the droplets may be infused into an open sampling source such as direct inlet Rapid Evaporative Ionisation Mass Spectrometry ("REIMS") ion source.

Figure 2:
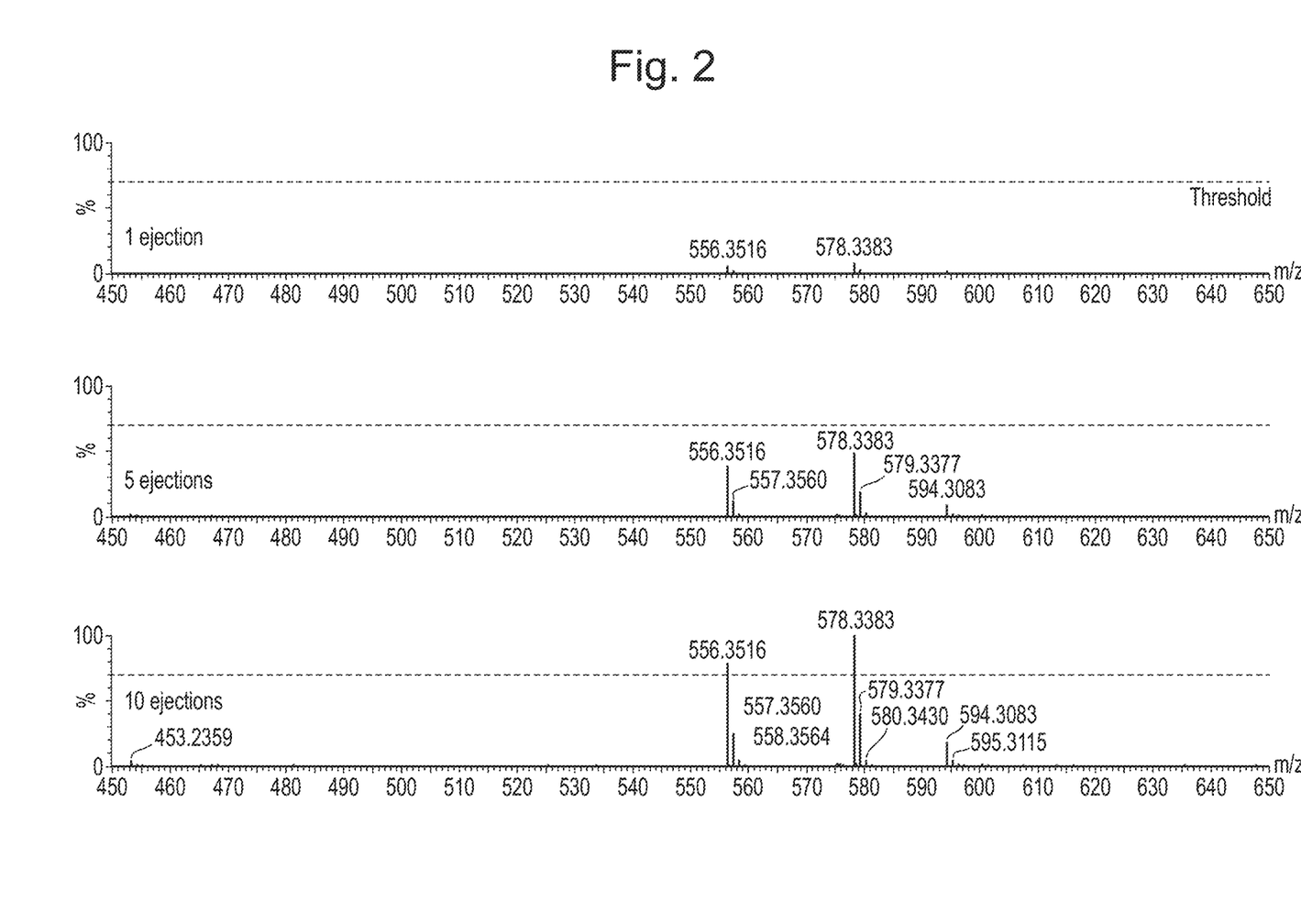
FIG. 2 shows three mass spectra resulting from the analysis of a sample after one, five and ten sample ejections and wherein a quality (intensity) threshold is imposed which is exceeded after seven injections.

FIG. 2 shows three mass spectra resulting from the analysis of a sample after one, five and ten ejections of sample from a sample well using an Acoustic Mist Ionisation source. The mass spectra shown in FIG. 2 illustrate how a quality threshold (which may, for example, comprise an ion intensity or cumulative ion intensity threshold) may be utilised. According to such an embodiment sample is repeatedly ejected or otherwise released from a liquid sample 2 held in a sample well until a quality threshold (e.g. ion intensity of most abundant ion species) is met or exceeded.

The three mass spectra shown in FIG. 2 demonstrate the effect of summing multiple ejections of a sample from the same sample well. As shown in FIG. 2, according to various embodiments a threshold for spectral quality may be defined and may relate, for example, to a minimum number of ions in the most intense ion peak or another corresponding intensity value. The ejection process may according to various embodiments be repeated until the intensity threshold or other threshold is met or exceeded. In the example shown, the most intense ion peak relates to ions having a mass to charge ratio of 578.3 and the indicated threshold is exceeded after seven ejections. It will be apparent, therefore, from FIG. 2 that after one and five sample ejections the intensity threshold has not yet been met but that after ten sample ejections the intensity threshold has been clearly exceeded.

Figure 3:
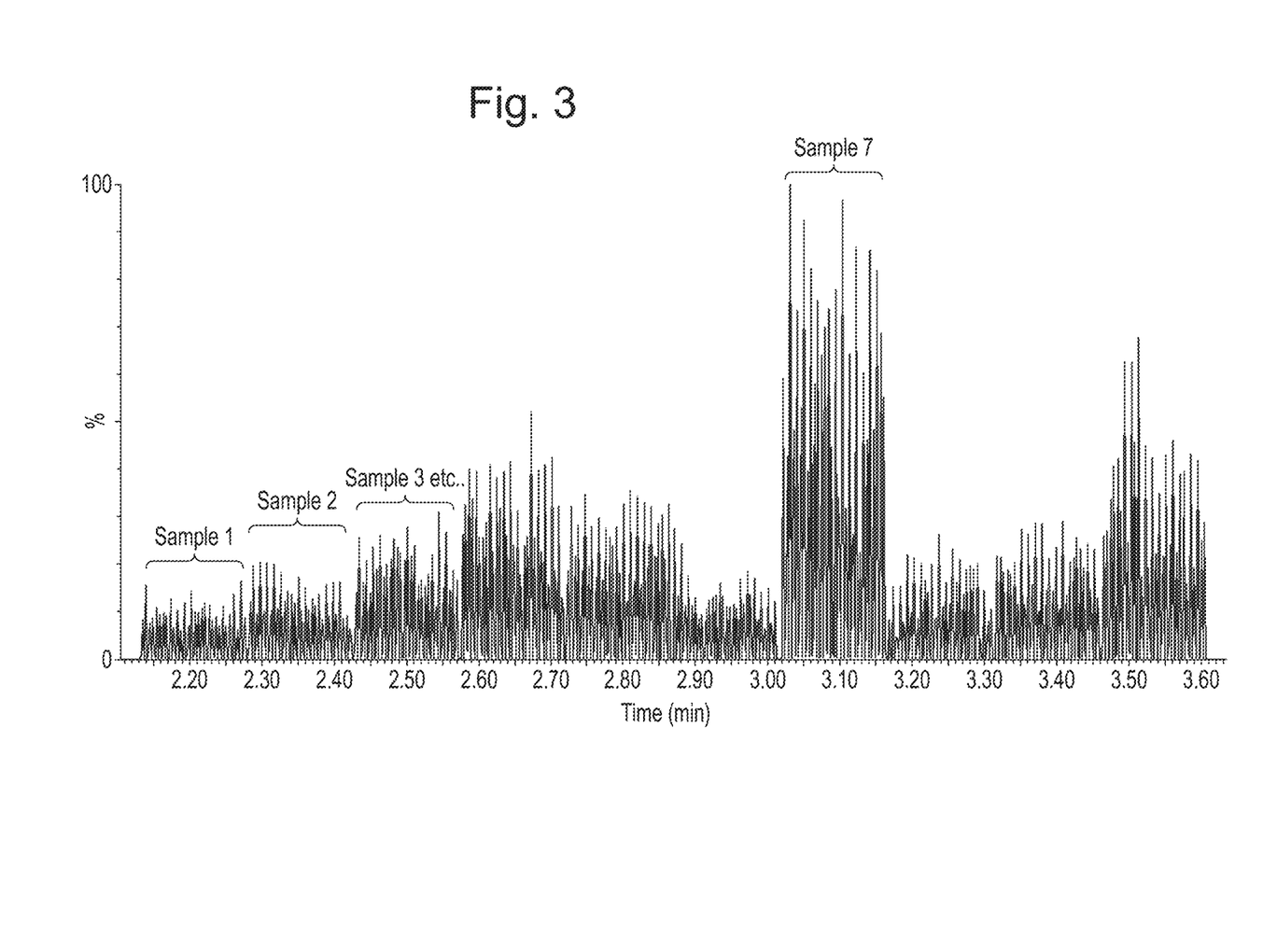
FIG. 3 illustrates how the intensity of an ion signal may vary from sample to sample in different wells of a sample plate and illustrates how different samples may need to be ejected or otherwise released from a sample well of sample plate a different number of times until a quality (intensity) threshold is met or exceeded.

FIG. 3 illustrates that the intensity of a signal may vary considerably from sample to sample. As discussed above, according to various embodiments a sample may continue to be ejected or otherwise released from a sample well until it has been determined that a quality threshold (which may comprise an intensity threshold) has been met or exceeded. FIG. 3 shows the result of analysing various different samples of nominally the same concentration wherein ten ejections were performed per sample well. As can be seen from FIG. 3, the absolute amount of signal (i.e. the total number of ions emitted or ejected per ejection) can vary considerably dependent upon the sample. For example, with reference to FIG. 3, sample #7 produced a signal which was approximately ×6 times higher than the signal produced by sample #1. If a spectral quality threshold based on the total number of ions produced is utilised then it can be seen that sample #7 would require approximately ×6 times fewer ejections to meet this threshold than sample #1.

Figure 4:
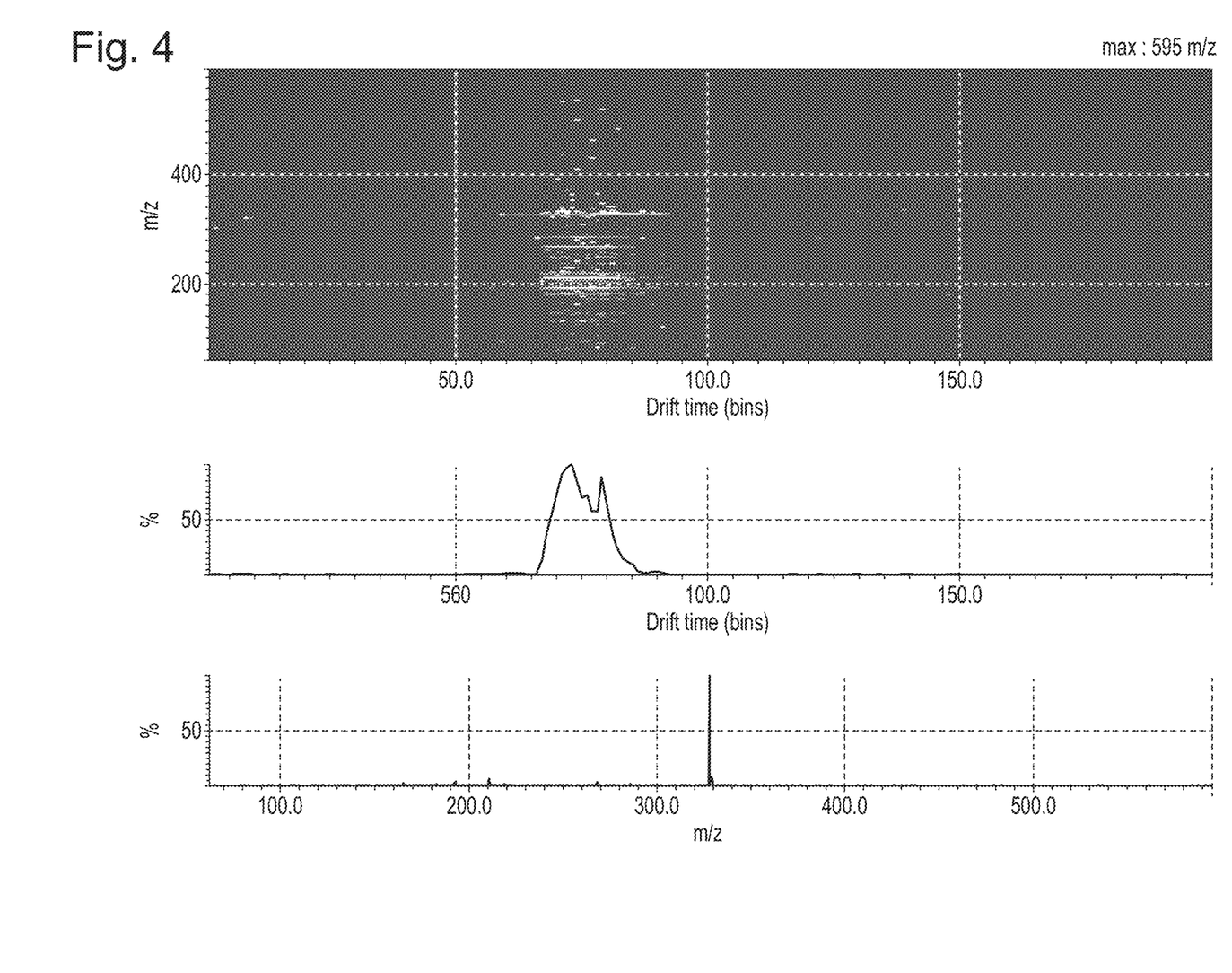
FIG. 4 shows the drift times and mass to charge ratios of ions which have been ionised from a sample using an Acoustic Mist Ionisation ion source and illustrates how according to an embodiment sample from the same sample well may be continually ejected until ion mobility data relating to analyte ions of interest is obtained and wherein the ion mobility data is of sufficient quality (peak shape and/or intensity) for an accurate determination of the ion mobility of the ions to be determined.

The upper figure of FIG. 4 shows the drift times and associated mass to charge ratios of ions from a sample. An ion mobility spectrum relating to ions having a mass to charge ratio of 328 is also shown. The example shown in FIG. 4 relates to ion mobility data generated from a sample which was ionised using an Acoustic Mist Ionisation source. The average mobility for each of the principal ion species observed in the mass spectrum can be determined by interrogation of the data. As the precision of the measurement is related to the number of ions sampled, the ionisation may be continued until the results are deemed acceptable.

According to various embodiments the quality threshold may correspond with the quality of an ion mobility peak. In the particular example shown in FIG. 4, although the average ion mobility could be determined from the ion mobility peak as shown, the peak shape is somewhat irregular. Accordingly, sample may continue to be ejected from a sample well until a corresponding ion mobility peak is obtained which is determined to have an acceptable peak shape. For example, the ion mobility peak may have a smoother more regular peak shape and may have a standard deviation $\sigma$ in the range $\sigma \leq 0.1$, 0.1-0.2, 0.2-0.3, 0.3-0.4, 0.4-0.5, 0.5-0.6, 0.6-0.7, 0.7-0.8, 0.8-0.9, 0.9-1.0 or $\geq 1.0$.

Figure 5:
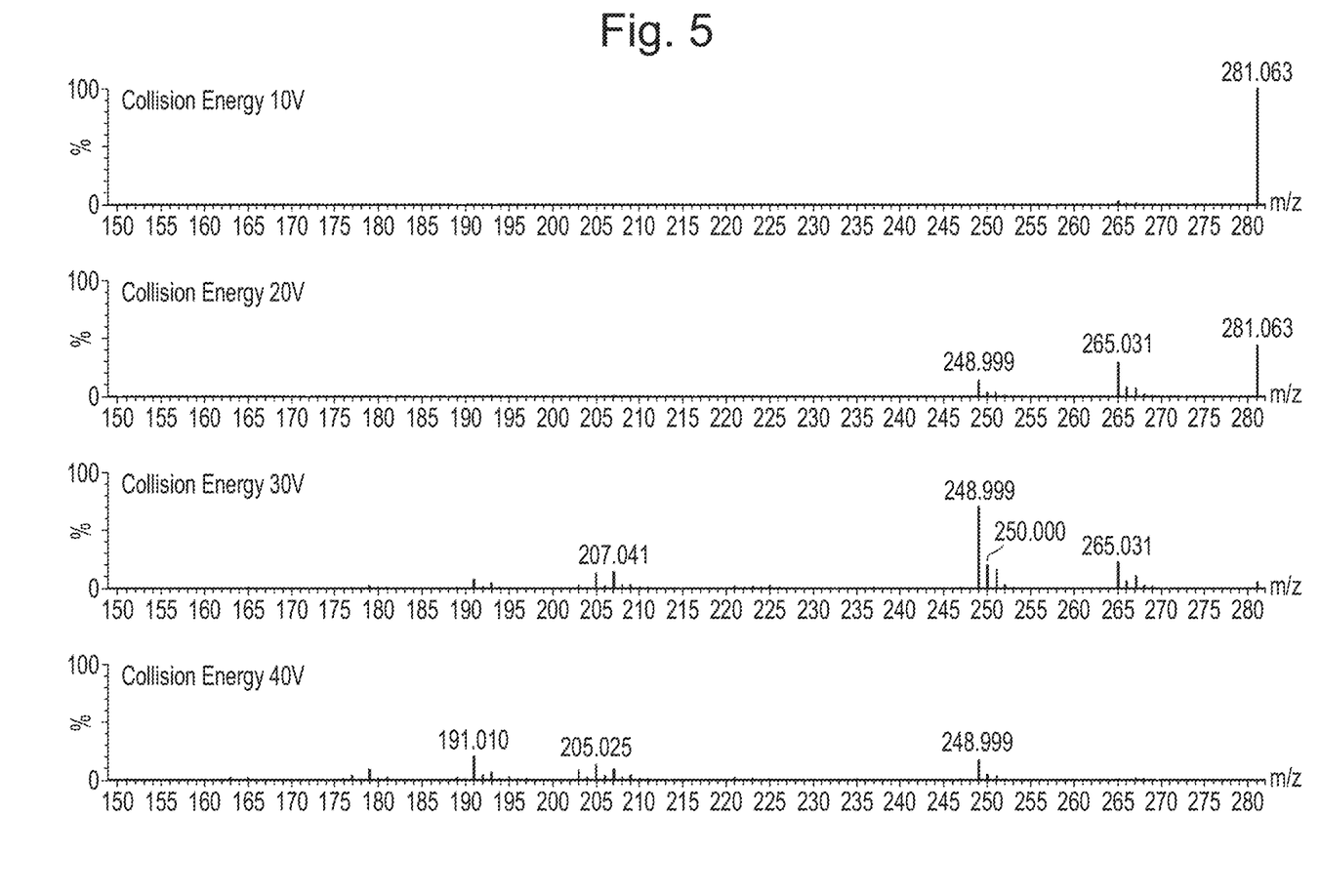
FIG. 5 shows four fragmentation mass spectra which were obtained at different collision energies and wherein according to an embodiment a determination may be made that fragmentation mass spectral data which is obtained at a particular collision energy meets or exceeds a particular quality threshold whereupon fragmentation mass spectral data may then be obtained at an optimum collision energy.

FIG. 5 shows four mass spectra and is an example of a MS/MS experiment which was conducted at multiple different collision energies. Precursor or parent ions having a nominal mass to charge ratio of 281 were selected by a mass filter. The selected parent ions were then fragmented at a range of different collision energies. The principal fragments and the optimum collision energy for each fragmentation pathway may then be determined.

From FIG. 5 it is apparent that parent ions remain largely unfragmented at a collision energy of 10V i.e. when parent ions are caused to enter a collision cell filled with a collision gas for fragmentation and wherein there is a potential difference of 10V between the ion optics immediately upstream of the collision cell and the entrance to the collision cell.

In another experiment the collision energy is increased to 20V. Fragment ions having a nominal mass to charge ratio of 265 are observed. However, these fragment ions may not be of particular interest since they correspond with parent ions which have lost oxygen and are not suitable for Multiple Reaction Monitoring ("MRM") experiments. Other fragment ions are observed namely fragment ions having a nominal mass to charge ratio of 249 and these fragment ions correspond with fragment ions of interest. However, it is noted that the fragment ion of interest having a nominal mass to charge ratio of 249 have a lower intensity than fragment ions having a nominal mass to charge ratio of 265.

In another experiment wherein the collision energy wass increased to 30V the fragment ions of interest having a nominal mass to charge ratio of 249 now have a greater intensity than fragment ions having a nominal mass to charge ratio of 265. Very few unfragmented parent ions having a nominal mass to charge ratio of 281 are observed. Other fragment ions having a nominal mass to charge ratio of 205 and 207 are observed.

In a yet further experiment the collision energy was increased still further to 40V. At this high collision energy essentially all parent ions are fragmented and also fragment ions having a nominal mass to charge ratio of 265 are also not observed. Fragment ions having a nominal mass to charge ratio of 191 are observed.

Various embodiments are contemplated wherein a number of experiments may be performed and it is desired to determine an optimum collision energy wherein one, two, three, four or more relatively intense fragment ions are observed which have a mass or mass to charge ratio difference ($\Delta m$) which is greater than a certain amount relative to the corresponding parent ions. In the specific case of the example shown in FIG. 5, the mass or mass to charge ratio difference ($\Delta m$) may be set to be greater than 16 so as to exclude fragment ions having a nominal mass to charge ratio of 265.

Accordingly, embodiments are contemplated wherein one of the experiments which may be performed on a sample comprises a MS/MS experiment wherein parent ions having a particular mass to charge ratio or mass are selected by a mass filter. Fragmentation spectra or fragmentation mass spectral data may then be obtained at a range of different collision energies or other settings. Sample may continue to be ejected from a sample until a determination is made that a quality threshold has been met or exceeded. The quality threshold in this case may be a determination that, for example, at least one, two, three, four or more fragment ions are observed in fragmentation mass spectra optionally having an intensity above an intensity threshold and optionally wherein these fragment ions have a mass or mass to charge ratio difference (Δm) relative to the corresponding parent ions greater than a certain amount. Embodiments are contemplated wherein the mass or mass to charge ratio difference (Δm) which is set or otherwise required may be at least 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40.

Embodiments are also contemplated wherein further experiments may then additionally be performed. For example, having determined an optimum collision energy for different parent ions, fragmentation mass spectral data may then be obtained for some or all parent ions of interest. Ion mobility data may also be obtained for some or all parent ions of interest. Ion mobility data may be obtained for some or all fragment ions having an intensity above an intensity threshold. Ion mobility Collision Cross Sections ("CCS") may be determined for at least some or all of the parent ions and/or fragment ions of interest. Once it is determined that fragmentation data meeting a quality threshold and/or ion mobility data meeting a quality threshold haves been obtained, then the processing or handling system may be arranged to move on to sample the next sample.

It will be understood, therefore, that according to various embodiments sample from a sample well may be ejected and a number of experiments may be performed on that sample including obtaining fragmentation and ion mobility data. The sample may continue to be sampled until a determination is made that the fragmentation and/or ion mobility data is of sufficient quality i.e. meets or exceeds a quality threshold. Once a determination is made that data has been obtained which meets or exceeds a quality threshold then the system may then discontinue with sampling or ionising the present sample and may then move on to sample or ionise the next sample.

It will be understood that the amount of sample infused can be varied depending upon the degree of rigour required and the number of reactions which are desired to be characterised.

Various embodiments have been described and discussed above which utilise a soft ionisation ion source such as an Acoustic Mist Ionisation ion source to repeatedly or continuously eject or ionise sample optionally in the context of High Throughput Screening applications. A sample is repeatedly or continuously ionised or ejected until a determination is made that a quality threshold has been met. Optionally a number of experiments may be performed on the sample. The quality threshold may relate to an intensity threshold, for example, of parent and/or fragment ions. Additionally or alternatively, the quality threshold may relate to the quality of ion mobility data which is obtained. For example, a sample may continue to be sampled or ionised until ion mobility peaks having a sufficiently high quality profile are obtained. Whether or not an ion mobility peak is determined to meet a spectral quality threshold may be determined by determining whether or not a standard deviation or other measure of peak shape or profile meets or exceeds a threshold. It should be understood that the concept of meeting or exceeding a quality threshold may include determining whether or not a peak has a standard deviation, variance or other measure of peak shape less than a certain amount.

The various embodiments described above enable High Throughput Sampling to be performed in a more efficient manner than conventional approaches. As a result, sample is neither undersampled nor oversampled but rather a determination is made in respect of each sample that sufficiently high quality data has been obtained before moving on to sample the next sample. The various embodiments described above therefore represent a significant advance in the art.

Although the present invention has been described with reference to preferred embodiments, it will be understood by those skilled in the art that various changes in form and detail may be made without departing from the scope of the invention as set forth in the accompanying claims.

The invention claimed is:

1. A method of mass spectrometry comprising:
repeatedly or continuously causing first analyte sample to be released or ejected from a first sample;
mass analysing the released first analyte sample to obtain first mass spectral data; and
determining if a quality threshold has been met, wherein the first analyte sample is continued to be released or ejected from the first sample only until the quality threshold is met, and when the quality threshold has been met then
the method then further comprises:
repeatedly or continuously causing second analyte sample to be released or ejected from a second analyte sample.

2. A method as claimed in claim 1, wherein the quality threshold comprises a spectral quality threshold or a mass spectral quality threshold.

3. A method as claimed in claim 1, wherein the step of determining whether or not the quality threshold has been met comprises determining the most intense ion peak in the mass spectral data and/or determining whether the number of ions or the intensity of ions relating to the most intense ion peak meets an intensity threshold.

4. A method as claimed in claim 1, wherein the step of determining whether or not the quality threshold has been met comprises determining whether the number of ions or the intensity of ions relating to one or more ion peaks meets or exceeds an intensity threshold.

5. A method as claimed in claim 1, wherein the step of determining whether or not the quality threshold has been met comprises determining whether one or more ions or ion peaks exceed meet an intensity threshold and/or whether the one or more ion peaks or corresponding ion mobility peaks have either: (i) an expected peak shape or profile; (ii) a substantially Gaussian distribution or other profile; or (iii) a standard deviation or variance above or below a threshold.

6. A method as claimed in claim 1, wherein the step of causing the first and second analyte samples to be released or ejected from a sample comprises using an Acoustic Mist Ionisation ("AMI") ion source to release or eject the analyte sample.

7. A method as claimed in claim 1, wherein the step of causing the first and second analyte samples to be released or ejected from a sample comprises using an Acoustic Droplet Ejection ("ADE") source to release or eject sample.

8. A method as claimed in claim 1, wherein the step of causing the first and second analyte samples be released or ejected from a sample comprises using a Laser Assisted Rapid Evaporative Ionisation Mass Spectrometry ("LA-REIMS") ionisation source to release or eject sample.

9. A method of high throughput screening comprising a method of mass spectrometry as claimed in claim 1.

10. A method of mass spectrometry comprising:
repeatedly or continuously causing first analyte sample to be released or ejected from a first sample;
performing a first experiment on the first analyte sample;
mass analysing the released first analyte sample to obtain first mass spectral data; and
determining if a quality threshold has been met, wherein the first analyte sample is continued to be released or ejected from the first sample only until the quality threshold has been met, and when the quality threshold has been met then the method further comprises:
performing a second experiment on the first analyte sample, wherein the results of the first experiment are used to determine the conditions for the second experiment.

11. A mass spectrometer comprising:
an ion source which is arranged and adapted to repeatedly or continuously cause first analyte sample to be released or ejected from a first sample;
a mass analyser for mass analysing the first analyte sample to obtain first mass spectral data; and
a control system which is arranged and adapted to determine whether or not a quality threshold has been met, wherein the first analyte sample is continued to be released or ejected from the first sample only until the quality threshold has been met, and when the quality threshold has been met then the ion source is arranged to repeatedly or continuously cause second analyte sample to be released or ejected from a second sample.

12. A mass spectrometer as claimed in claim 11, wherein the control system is arranged and adapted to cause one or more experiments to be performed on the first analyte sample, wherein one or more of the experiments or each experiment is performed until a determination is made that the quality threshold has been met, and wherein the control system is further arranged and adapted: (i) to repeatedly or continuously cause the second analyte sample to be ejected from the second sample; and (ii) to perform one or more experiments on the second analyte sample, wherein one or more of the experiments or each experiment is performed until a determination is made that a quality threshold has been met.

13. A mass spectrometer as claimed in claim 11, wherein the quality threshold comprises a spectral quality threshold or a mass spectral quality threshold.

14. A mass spectrometer as claimed in claim 11, wherein the control system is arranged and adapted to determine the most intense ion peak in the mass spectral data and/or to determine whether the number of ions or the intensity of ions relating to the most intense ion peak meets an intensity threshold.

15. A mass spectrometer as claimed in claim 11, wherein the control system is arranged and adapted to determine whether the number of ions or the intensity of ions relating to one or more ion peaks meets an intensity threshold.

16. A mass spectrometer as claimed in claim 11, wherein the control system is arranged and adapted to determine whether one or more ions or ion peaks meets an intensity threshold and/or whether the one or more ion peaks or corresponding ion mobility peaks have either: (i) an expected peak shape or profile; (ii) a substantially Gaussian distribution or other profile; or (iii) a standard deviation or variance above or below a threshold.

17. A mass spectrometer as claimed in claim 11, wherein the ion source is selected from the group consisting of: (i) an Acoustic Mist Ionisation ("AMI") ion source; (ii) an Acoustic Droplet Ejection ("ADE") source; or (iii) a Laser Assisted Rapid Evaporative Ionisation Mass Spectrometry ("LA-REIMS") ion source.

* * * * *